(12) United States Patent
Wong et al.

(10) Patent No.: US 12,335,170 B2
(45) Date of Patent: Jun. 17, 2025

(54) VIRTUAL PHYSICAL CIRCUIT FOR ON-CHIP COMMUNICATION

(71) Applicant: Intel Corporation, Santa Clara, CA (US)

(72) Inventors: Kar Leong Wong, Folsom, CA (US); Satheesh Chellappan, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 528 days.

(21) Appl. No.: 17/704,666

(22) Filed: Mar. 25, 2022

(65) Prior Publication Data

US 2022/0217099 A1   Jul. 7, 2022

(51) Int. Cl.
 H04L 49/109  (2022.01)
(52) U.S. Cl.
 CPC .................. H04L 49/109 (2013.01)
(58) Field of Classification Search
 CPC ...................................... H04L 49/109
 USPC ........................................ 370/254
 See application file for complete search history.

(56) References Cited

U.S. PATENT DOCUMENTS

| | | | |
|---|---|---|---|
| 11,146,387 B1* | 10/2021 | Andreadakis | H04L 9/0869 |
| 2003/0126358 A1* | 7/2003 | Litt | G06F 11/3648 |
| | | | 712/E9.058 |
| 2005/0071713 A1* | 3/2005 | Vining | H03M 5/06 |
| | | | 714/700 |
| 2005/0091559 A1* | 4/2005 | Vining | H04L 7/0338 |
| 2017/0060808 A1* | 3/2017 | Randell | G06F 13/404 |

* cited by examiner

*Primary Examiner* — Faisal Choudhury
(74) *Attorney, Agent, or Firm* — Hanley, Flight & Zimmerman, LLC

(57) ABSTRACT

Techniques are provided for on-chip communication. A system implementing the techniques according to an embodiment includes a first virtual physical (vPhy) circuit couplable to a host through a vPhy interface and a second vPhy circuit couplable to a device, on the same chip as the host, through another vPhy interface. The system further includes a vPhy-to-vPhy interface between the vPhy circuits which includes signal lines to transmit a first data toggle signal from the first vPhy circuit to the second vPhy circuit, and a second data toggle signal from the second vPhy circuit to the first vPhy circuit. The first vPhy circuit is configured to generate the first data toggle signal based on a signal received from the host for transmission to the device. The second vPhy circuit is configured to generate the second data toggle signal based on signal received from the device for transmission to the host.

18 Claims, 6 Drawing Sheets

VIRTUAL PHYSICAL CIRCUIT FOR ON-CHIP COMMUNICATION

BACKGROUND

Many types of audio interface standards currently exist, including High Definition Audio (HDA), Integrated Display Based HDA (iDisp), Inter IC Sound (I2S), Digital Microphone Interface (DMIC), and Digital Speaker (DSPK), to name just a few. Each standard was developed for a particular ecosystem (e.g., personal computer, tablet, mobile phone, home entertainment system, gaming system, etc.), and oriented to particular audio codecs and/or transducer devices. It has become increasingly burdensome for system developers to support (and provide legacy support) for these many audio interface standards.

Figure 1:
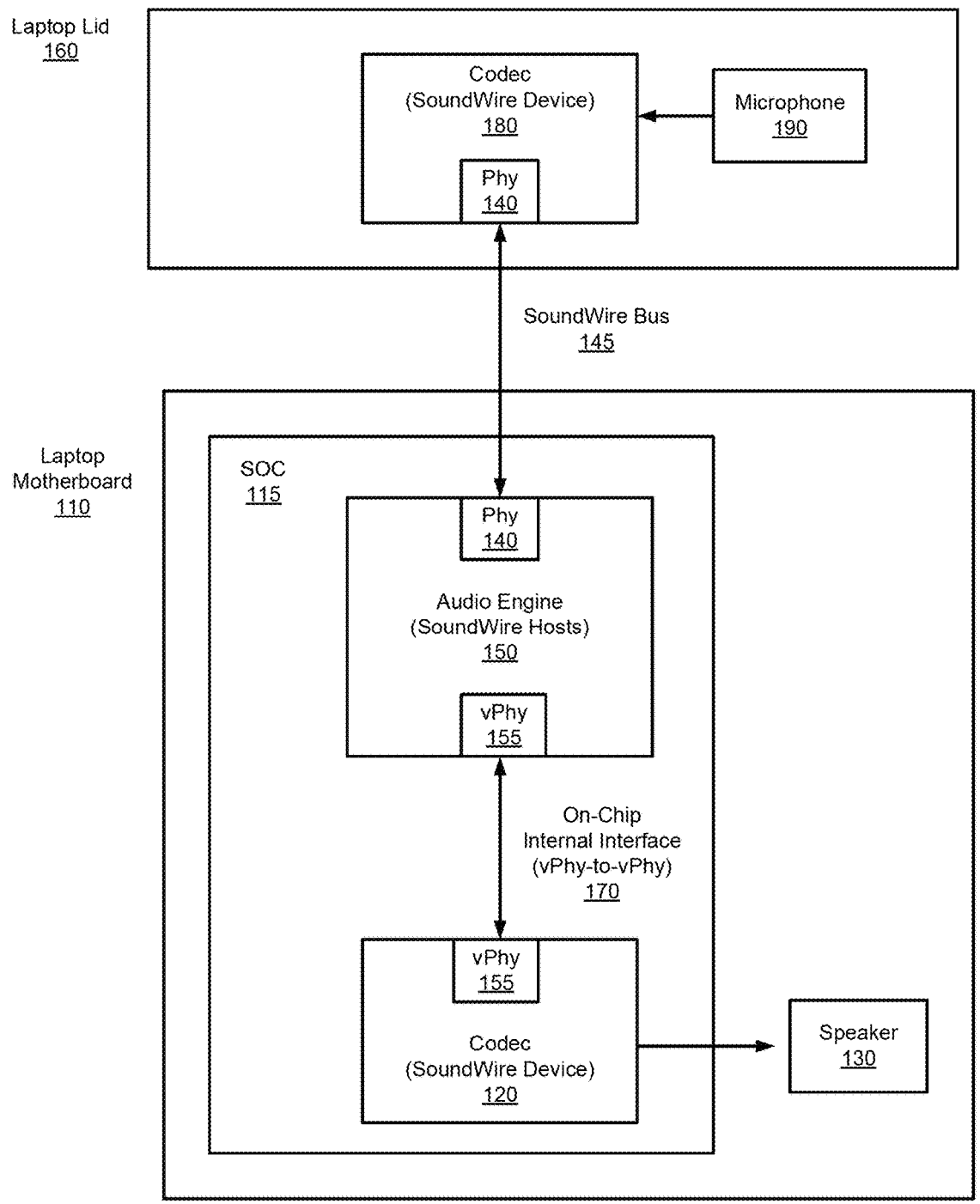
FIG. 1 illustrates an implementation of a SoundWire based audio communication system, configured in accordance with an embodiment of the present disclosure.

Although the following Detailed Description will proceed with reference being made to illustrative embodiments, many alternatives, modifications, and variations thereof will be apparent in light of this disclosure.

DETAILED DESCRIPTION

Techniques are provided herein for efficient on-chip implementation of a SoundWire audio communication system. As previously noted, there are many existing audio interface standards (e.g., HDA, iDisp, I2S, DMIC, DSPK, etc.) and it is burdensome for system developers to support them all. One emerging standard, SoundWire, is becoming more widely adopted and may allow developers to standardize on a SoundWire based audio codec hardware implementation and associated software stack. SoundWire can provide audio communication capability between a wide range of devices (e.g., audio sources and sinks), whether those devices are on the same chip (e.g., on-chip communication) or on different chips (e.g., off-chip communications).

For on-chip SoundWire communications, however, there are simplifications that can be implemented to achieve efficiencies, according to an embodiment of this disclosure. For example, when the audio endpoints are on the same chip, signal tri-stating and bus-keeper buffering functionality can be eliminated, and bi-directional signal lines can be replaced with unidirectional data lines through the use of vPhy circuits located near the audio endpoints, thus reducing cost, as will be explained in greater detail below. Additionally, under this scheme, buffering-based timing requirements or constraints can be relaxed. To this end, techniques are provided herein for a virtual physical (vPhy) circuit to convert SoundWire bus signaling format to an on-chip internal interface format. The vPhy circuits are coupled to each SoundWire enabled device (e.g., at an audio endpoint).

The disclosed techniques can be implemented, for example, in a system-on-a-chip (SoC) of a computing platform, although other embodiments will be apparent. The system or product is configured to provide efficient on-chip implementation of SoundWire based audio communication between audio endpoints that are located on the same chip or die. The disclosed techniques may also be employed across multiple dies or chiplets that may be deployed in a single chip package. In accordance with such an embodiment, a system to implement these techniques includes a first vPhy circuit coupled to a host through a first vPhy interface and a second vPhy circuit coupled to a device, on the same chip as the host, through a second vPhy interface. The system further includes an on-chip internal interface (e.g., a vPhy-to-vPhy interface) to provide efficient communication between the vPhy circuits. The internal interface includes signal lines to transmit a first data toggle signal from the first vPhy circuit to the second vPhy circuit, and a second data toggle signal from the second vPhy circuit to the first vPhy circuit. The first vPhy circuit is configured to generate the first data toggle signal based on a signal received from the host for transmission to the device. The second vPhy circuit is configured to generate the second data toggle signal based on a signal received from the device for transmission to the host.

As will be appreciated, the techniques described herein may reduce the signaling complexity and timing control by using unidirectional signaling instead of bi-directional signaling. Additionally, the techniques allow for more flexible placement of the SoundWire host and devices on the chip, since each vPhy can be located close to the host or device, using a point to point connection between each vPhy rather than requiring a centralize shard vPhy for all devices. This in turn reduces chip surface area utilization and cost, compared to existing techniques that link two audio endpoints directly using a SoundWire bus. The disclosed techniques also relax timing constraints which allows for increased distance between audio endpoints on the chip (e.g., longer signal lines may be routed). The disclosed techniques can be implemented on a broad range of platforms including workstations, laptops, tablets, smartphones, entertainment systems, and voice controlled systems.

System Architecture

FIG. 1 illustrates, at a high level, an implementation of SoundWire based audio communication 100 on a computing platform, configured in accordance with an embodiment of the present disclosure. A laptop is shown here as an example of a platform that provides communication of audio signals between various platform components such as an audio engine 150, a speaker 130, and a microphone 190. The laptop is shown in this example to comprise a motherboard 110 (e.g., a circuit board in the base of the laptop) and a lid 160. The motherboard 110 is shown to include speaker 130 and an SoC 115 that includes the audio engine 150 and a codec 120. The codec 120 is a SoundWire capable device configured to provide audio to the speaker 130, which may be located on the motherboard or otherwise built into the laptop base. As an example, the codec 120 could be an implementation of a Bluetooth (BT) interface integrated onto the SoC 115 to provide communication with a BT headset. The motherboard 110 may include other components such as a processor and memory.

The laptop lid 160 is shown to include a microphone 190 and a codec 180. The codec 180 is a SoundWire capable device configured to receive audio from the microphone. The laptop lid may include other components such as a display and a camera. Although microphone 190 and codec 180 are shown to be in the laptop lid in this example, they could alternatively be located on the laptop motherboard in other examples.

In this example, the audio endpoints are the audio engine 150, the first codec 120, and the second codec 180. The audio engine 150 and codec 120 are located on the same chip, SoC 115, while codec 180 is located off-chip, on the laptop lid 160. Audio engine 150 is configured to receive, process, and generate audio signals, for example in pulse density modulation (PDM) format. The audio engine 150 is coupled to codec 180 through a SoundWire bus 145, and to codec 120 through an on-chip internal interface 170, the details of which will be described below. The codecs are configured to convert the audio, for example, from PDM format used by the audio engine to pulse code modulation (PCM) format used by the devices.

In this example, the on-chip internal interface 170 is used for on-chip communication between the audio engine 150 and the codec 120, instead of a SoundWire bus, to provide the advantages and efficiencies that can be achieved by using unidirectional signaling for on-chip communication, as will be described in greater detail below. Additionally, the on-chip communication techniques described herein avoid the buffering, tri-stating, and timing requirements associated with the SoundWire standard which can be difficult to meet for longer distance signal routes.

Figure 2:
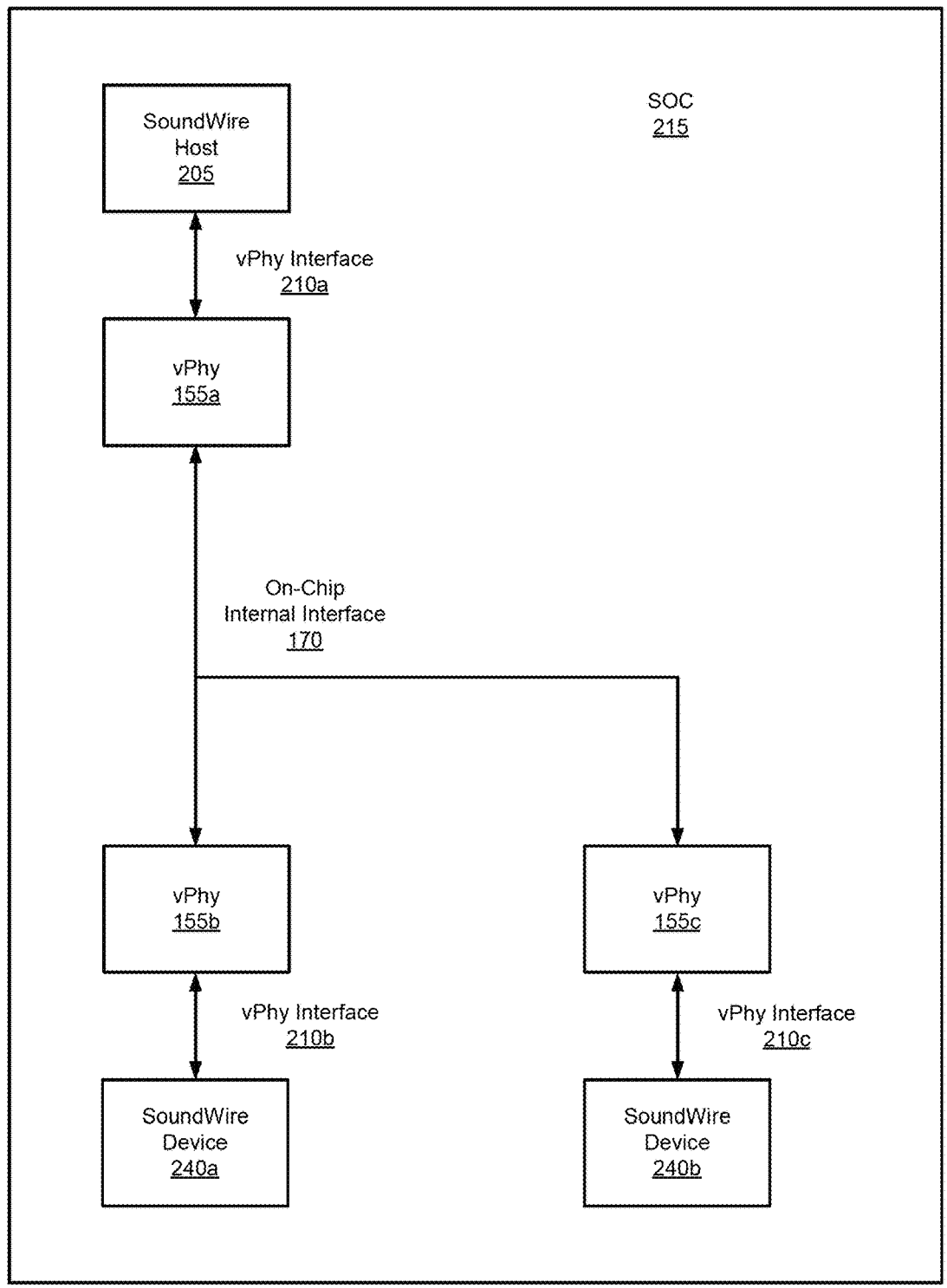
FIG. 2 is a block diagram of an on-chip implementation of a SoundWire audio communication system, configured in accordance with an embodiment of the present disclosure.

FIG. 2 is a block diagram of an on-chip implementation of a SoundWire audio communication system 200, configured in accordance with an embodiment of the present disclosure. An SoC 215 is shown to include a SoundWire Host 205, vPhy interfaces 210, vPhy circuits 155, an on-chip internal interface 170, and SoundWire devices 240.

The SoundWire Host 205 may be configured to act as a SoundWire bus master, although that is not a requirement, while SoundWire devices 240a and 240b may be configured to act as SoundWire bus targets. Host 205 may correspond, for example, to the audio engine 150 of FIG. 1, and devices 240a and 240b may correspond to on-chip codecs such as codec 120 of FIG. 1. Host 205 is coupled to a first vPhy circuit 155a, which is located in close proximity to the host, relative to the distance to the devices 240a and 240b. Similarly, devices 240a and 240b are coupled to second and third vPhy circuits 155b and 155c, which are located in close proximity to the respective devices, relative to the distances to the host and the other device. In some embodiments, additional vPhy circuits can be deployed in close proximity to additional SoundWire capable devices that are connecting on the same on-chip internal interface 170.

The vPhy interfaces 210 are configured to couple the host and the devices to their respective vPhy circuits over those relatively short distances. The vPhy circuits 155 are configured to convert the SoundWire data signaling format to a format compatible with the on-chip internal interface 170 for efficient communication between the vPhy circuits, as described in greater detail below.

Although the host 205 and device 240 are shown to be located on the same SoC 215 in this example, in some embodiments they may be located on different SoCs of separate dies on the same chip.

Figure 3:
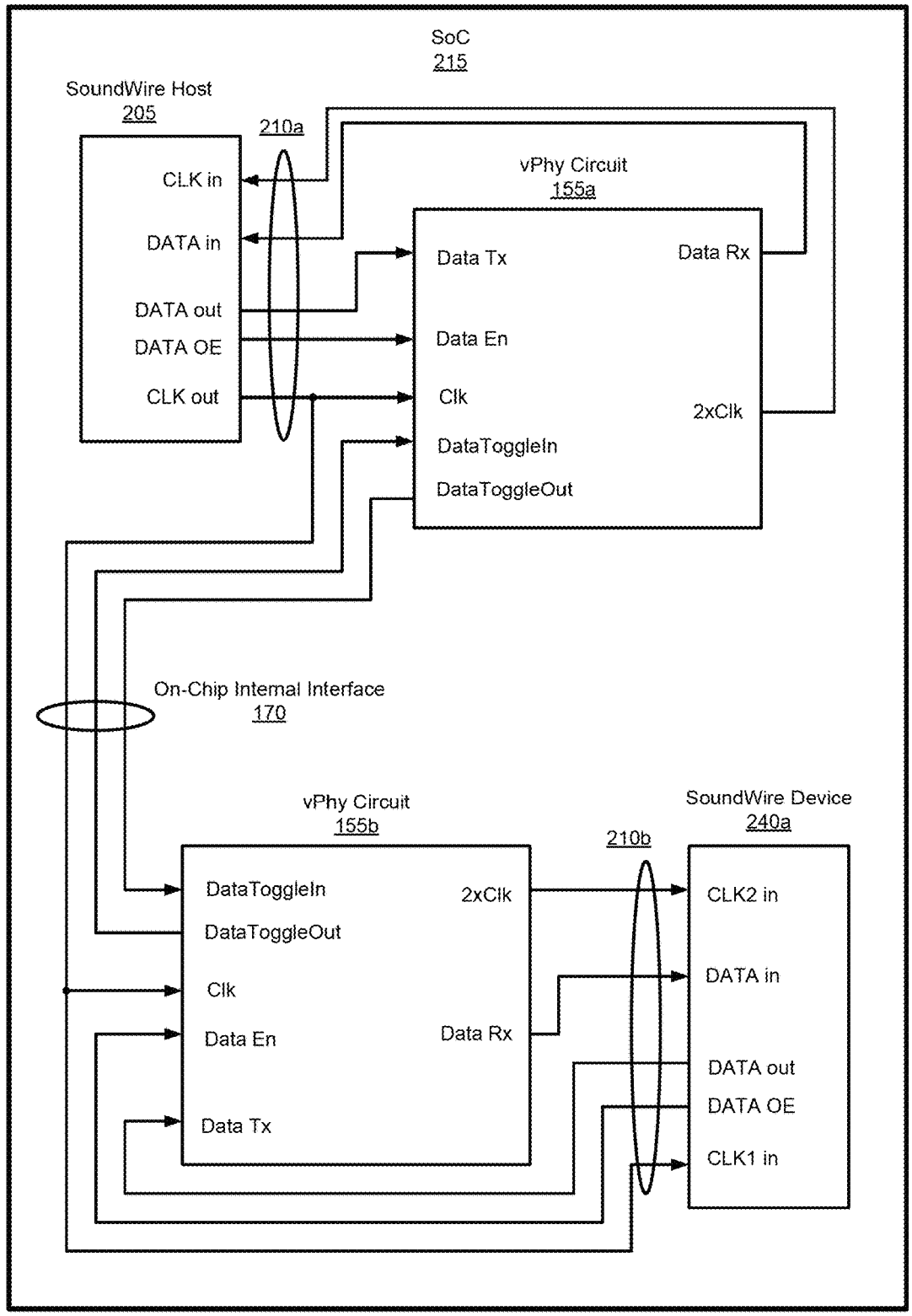
FIG. 3 is a block diagram illustrating the signaling operation of virtual physical (vPhy) circuits in the communication system of FIG. 2, in accordance with an embodiment of the present disclosure.

FIG. 3 is a block diagram illustrating the signaling operation 300 of virtual physical (vPhy) circuits 155 in the communication system of FIG. 2, in accordance with an embodiment of the present disclosure. The SoundWire host 205 is shown to communicate with the vPhy circuit 155a using vPhy interface signal lines 210a. In particular, the host clock out signal (CLK out) is supplied to the vPhy clock port (Clk). The host data out signal (DATA out) is supplied to the vPhy data transmit port (Data Tx), which is data to be transmitted by the vPhy to another vPhy, over the on-chip internal interface 170. The host data output enable (DATA OE) signal is supplied to the vPhy data enable port (Data En).

The vPhy generates Data Rx which is a signal that is resolved from data that is received and transmitted by vPhys over the on-chip internal interface 170, as will be described below in connection with FIG. 4. This Data Rx is supplied to the data in port (DATA in) of the host which is a bi-directional data pin.

A doubled clock signal (2×Clk) that is generated by the vPhy is supplied back to the clock in port (CLK in) of the host. The vPhy circuit communicates with the other vPhy circuits over the on-chip internal interface 170 using two unidirectional signals: DataToggleIn and DataToggleOut. The on-chip internal interface 170 also includes the clock out signal provided by the host.

The same signaling arrangement exists between the SoundWire device 240a and the associated vPhy circuit 155b, as well as between any additional devices and Vphy circuits that may exist.

Figure 4:
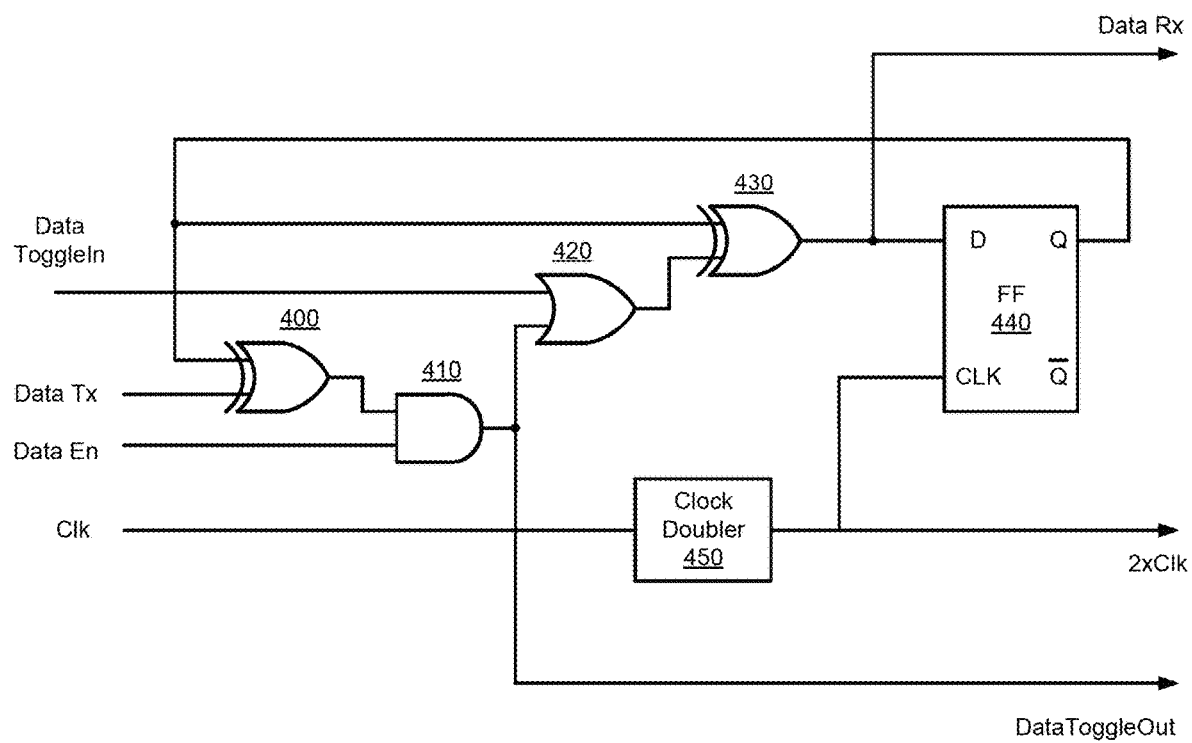
FIG. 4 is a block diagram of the vPhy circuit of FIG. 3, configured in accordance with an embodiment of the present disclosure.

FIG. 4 is a block diagram of the vPhy circuit 155 of FIG. 3, configured in accordance with an embodiment of the present disclosure. The vPhy circuit 155 is shown to include a first Exclusive Or (XOR) gate 400, an AND gate 410, an OR gate 420, a second XOR gate 430, and a latch (e.g., a D type flip flop circuit) 440. In some embodiments, the vPhy circuit also includes a clock doubler circuit 450.

Data bits are transmitted and received over the SoundWire bus in non-return-to-zero inverted (NRZI) format, which is to say that a level change (whether from zero to one or from one to zero) represents a logical one, while a constant level (whether zero or one) represents a logical zero.

Turning first to the vPhy circuit 155a, coupled to the host 205, the latch 440 is configured to store the previously transmitted NRZI data bit (Data Tx) received from the host 205. The latch also maintains that data bit as an NRZI data receive bit (Data Rx) on the SoundWire bus back to the host, until a change is detected in the Data Tx.

XOR gate 400 is configured to detect a change in Data Tx (e.g., a new NRZI transmit data value driven by the host device.

AND gate 410 is configured to perform a logical AND between the change detection signal generated by XOR gate 400 and the data output enable signal provided by the host (which indicates that the change is valid and intended for transmission). The output of AND gate 410 is propagated forward and used to request a change in the state of latch 440.

The output of AND gate 410 is also transmitted as the DataToggleOut signal over the on-chip internal interface 170 to the other vPhy circuits (e.g., 155b) where it is received as the DataToggleIn signal. If set to a logical one, the DataToggleIn signal will request a change in the state of the latch of the other vPhy circuits so that the latches of all the vPhy circuits are set to the same NRZI value.

OR gate 420 is configured to allow either a detected change from the host 205 or the DataToggleIn signal received from another vPhy (indicating a change in a remote device e.g., 240a) to propagate to XOR gate 430. The OR gate thus performs a bi-directional resolution (e.g., resolves data that is being received with data that is being transmitted).

The output of the XOR gate 430 causes the latch 440 to toggle and update with a new NRZI bit value. The latch 440 is configured to latch to the new input value (presented on the D port) on the rising edge of the 2×Clk signal, as described below.

In some embodiments, the vPhy circuit 155 comprises a clock doubler circuit 450 configured to generate a 2×Clk signal at double the clock rate of the clock signal provided by the host 205. The 2×Clk signal is used for SoundWire Double Data Rate (DDR) operation. In these embodiments, the 2×Clk signal is used to clock the input to the latch 440 on the rising edge of the 2×Clk signal.

Turning now to vPhy circuit 155b, coupled to device 240a, this vPhy circuit is also detecting potential new NRZI data bits driven by the device 240a. For example, if a change is detected, vPhy 155b will update its own latch 440, in the same manner as described above for vPhy 155a, and also transmit a logical one on DataToggleOut of 155b to DataToggleIn of 155a. This transmission will feed a logical one to the OR gate 420 of vPhy 155a requesting a change in the state of the latch 440 of vPhy 155a.

The process repeats for each subsequent detected change in the NRZI value transmitted by host or device.

In some embodiments, the SoundWire bus may employ multiple data lines for parallel transmission. In this case, multiple vPhy circuits may be implemented in parallel, one for each data line which would include additional DataToggleIn and DataToggleOut signals for connection to each vPhy.

Methodology

Figure 5:
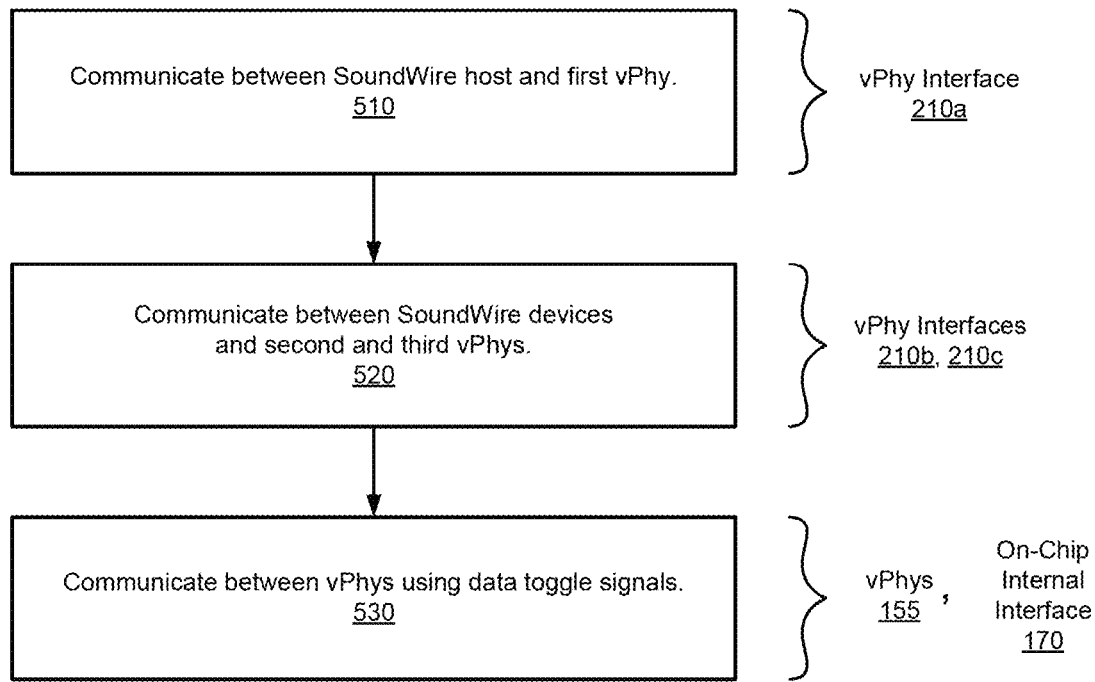
FIG. 5 is a flowchart illustrating a methodology for on-chip communication using the vPhy circuit of FIG. 3, in accordance with an embodiment of the present disclosure.

FIG. 5 is a flowchart illustrating a methodology 500 for on-chip communication using the vPhy circuit of FIG. 3, in accordance with an embodiment of the present disclosure. As can be seen, the example method includes a number of phases and sub-processes, the sequence of which may vary from one embodiment to another. However, when considered in the aggregate, these phases and sub-processes form a process for on-chip SoundWire based communication using the vPhy circuit, in accordance with certain of the embodiments disclosed herein. These embodiments can be implemented, for example, using the system architecture illustrated in FIGS. 1-4, as described above. However other system architectures can be used in other embodiments, as will be apparent in light of this disclosure. To this end, the correlation of the various functions shown in FIG. 5 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module having decoupled sub-modules can be used to perform all of the functions of method 500. Thus, other embodiments may have fewer or more modules and/or sub-modules depending on the granularity of implementation. In still other embodiments, the methodology depicted can be implemented as a computer program product including one or more non-transitory machine-readable mediums that when executed by one or more processors cause the methodology to be carried out. Numerous variations and alternative configurations will be apparent in light of this disclosure.

As illustrated in FIG. 5, in an embodiment, method 500 for on-chip SoundWire communication commences by communicating, at operation 510, between a SoundWire host and a first vPhy circuit through a first vPhy interface. At operation 520, a SoundWire device communicates with a second vPhy circuit through a second vPhy interface. In some embodiments, additional devices (and associated vPhy circuits and interfaces) may be employed, which operate in the same manner as described below.

At operation 530, the first vPhy circuit and the second vPhy circuit communicate through an on-chip internal interface that includes a first data toggle signal line and a second data toggle signal line. In some embodiments, the first vPhy circuit transmits a first data toggle signal to the second vPhy circuit on the first data toggle signal line, and the second vPhy circuit transmits a second data toggle signal to the first vPhy circuit on the second data toggle signal line. The first data toggle signal is generated by the first vPhy circuit based on a first signal received from the SoundWire host for transmission to the SoundWire device. The second data toggle signal is generated by the second vPhy circuit based on a second signal received from the SoundWire device for transmission to the SoundWire host. In some embodiments, the first signal received from the SoundWire host, and the second signal received from the SoundWire device are non-return-to-zero inverted (NRZI) signals.

Of course, in some embodiments, additional operations may be performed, as previously described in connection with the system. For example, the first vPhy circuit may generate an NRZI input signal to be provided as an input to the SoundWire host through the first vPhy interface based on the second data toggle signal received from the second vPhy circuit. Similarly, the second vPhy circuit may generate an NRZI input signal to be provided as an input to the SoundWire device through the second vPhy interface based on the first data toggle signal received from the first vPhy circuit.

In some embodiments, the host and the first vPhy circuit are implemented in a first SoC, and the device and the second vPhy circuit are implemented in a second SoC. In some embodiments, the first SoC and the second SoC are disposed on the same integrated circuit. In either case, the disclosed techniques provide for a less complex unidirectional implementation of the interface between vPhys which may allow for higher speed operation and longer signal lines compared to a traditional SoundWire bus implementation.

Example System

Figure 6:
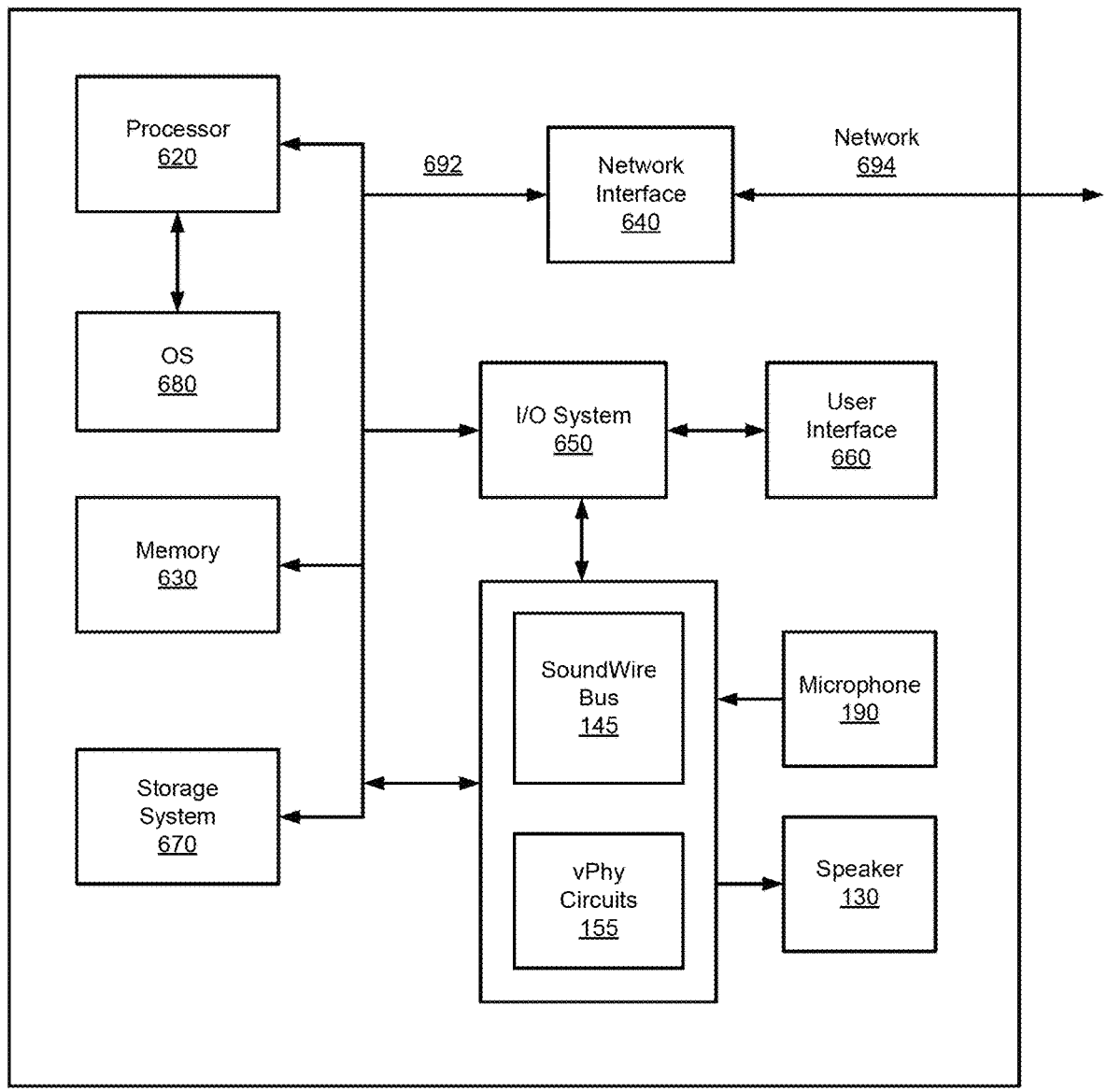
FIG. 6 is a block diagram schematically illustrating a computing platform configured to implement the on-chip SoundWire audio communication system of FIG. 2, in accordance with an embodiment of the present disclosure.

FIG. 6 is a block diagram schematically illustrating a computing platform 600 configured to implement the on-chip SoundWire audio communication system of FIG. 2, in accordance with an embodiment of the present disclosure. In some embodiments, platform 600 may be the laptop illustrated as an example in FIG. 1, or any type of personal computer, workstation, server system, tablet, touchpad, portable computer, handheld computer, palmtop computer, personal digital assistant (PDA), cellular telephone, combination cellular telephone and PDA, smart device (for example, smartphone, smart-speaker, or smart-tablet), mobile internet device (MID), messaging device, data communication device, wearable device, embedded system, home management system, and so forth. Any combination of different devices may be used in certain embodiments.

In some embodiments, platform 600 may comprise any combination of a processor 620, a memory 630, a network interface 640, an input/output (I/O) system 650, a user interface 660, a storage system 670, a microphone 190, a speaker 130, and one or more SoundWire busses 145 and vPhy circuits 155. As can be further seen, a bus and/or interconnect 692 is also provided to allow for communication between the various components listed above and/or other components. Platform 600 can be coupled to a network 694 through network interface 640 to allow for communications with other computing devices, platforms, devices to be controlled, or other resources. Other componentry and functionality not reflected in the block diagram of FIG. 6 will be apparent in light of this disclosure, and it will be appreciated that other embodiments are not limited to any particular hardware configuration.

Processor 620 can be any suitable processor, and may include one or more coprocessors or controllers, such as an audio processor, a graphics processing unit, or hardware accelerator, to assist in control and processing operations associated with platform 600. In some embodiments, the processor 620 may be implemented as any number of processor cores. The processor (or processor cores) may be any type of processor, such as, for example, a microprocessor, an embedded processor, a digital signal processor (DSP), a graphics processor (GPU), a tensor processing unit (TPU), a network processor, a field programmable gate array or other device configured to execute code. The processors may be multithreaded cores in that they may include more than one hardware thread context (or "logical processor") per core. Processor 620 may be implemented as a complex instruction set computer (CISC) or a reduced instruction set computer (RISC) processor. In some embodiments, processor 620 may be configured as an x86 instruction set compatible processor.

Memory 630 can be implemented using any suitable type of digital storage including, for example, flash memory and/or random-access memory (RAM). In some embodiments, the memory 630 may include various layers of memory hierarchy and/or memory caches as are known to those of skill in the art. Memory 630 may be implemented, for example, as a volatile memory device, such as a RAM, dynamic RAM (DRAM), or static RAM (SRAM) device. Storage system 670 may be implemented as, for example, a non-volatile storage device, such as one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 670 may comprise technology to increase the storage performance enhanced protection for valuable digital media when multiple hard drives are included.

Processor 620 may be configured to execute an Operating System (OS) 680 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with platform 600, and therefore may also be implemented using any suitable existing or subsequently-developed platform.

Network interface circuit 640 can be any appropriate network chip or chipset which allows for wired and/or wireless connection between other components of platform 600 and/or network 694, thereby enabling platform 600 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Example wireless networks include, for example, wireless local area networks, wireless personal area networks, wireless metropolitan area networks, cellular networks, and satellite networks.

I/O system 650 may be configured to interface between various I/O devices and other components of platform 600. I/O devices may include, for example, a user interface 660. User interface 660 may include devices such as a display element, touchpad, keyboard, and mouse, etc. I/O system 650 may include a graphics subsystem configured to perform processing of images for rendering on the display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 620 or any chipset of platform 600. Microphone 190 may be configured to receive audio and speaker 130 may be configured to broadcast audio. In some embodiments, the microphone and/or speaker may communicate through a SoundWire bus and those communications may then be routed on-chip through vPhy circuits 155.

It will be appreciated that in some embodiments, the various components of platform 600 may be combined or integrated in an SoC architecture. In some embodiments, the components may be hardware components, firmware components, software components or any suitable combination of hardware, firmware or software.

The vPhy circuits 155 are configured to provide efficient on-chip communication between SoundWire enabled audio devices. The vPhy circuits 155 may include any or all of the circuits/components illustrated in FIG. 4, as described above. These components can be implemented or otherwise used in conjunction with a variety of suitable software and/or hardware that is coupled to or that otherwise forms a part of platform 600. These components can additionally or alternatively be implemented or otherwise used in conjunction with user I/O devices that are capable of providing information to, and receiving information and commands from, a user.

In some embodiments, these circuits may be installed local to platform 600, as shown in the example embodiment of FIG. 6. Alternatively, platform 600 can be implemented in a client-server arrangement wherein at least some functionality associated with these circuits is provided to platform 600 using an applet, such as a JavaScript applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 694 or remotely coupled to network 694 by one or more other networks and/or communication channels.

In some cases, access to resources on a given network or computing system may require credentials such as usernames, passwords, and/or compliance with any other suitable security mechanism.

In various embodiments, platform 600 may be implemented as a wireless system, a wired system, or a combination of both. When implemented as a wireless system, platform 600 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 600 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 694. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 600 may comprise additional, fewer, or alternative subcomponents as compared to those included in the example embodiment of FIG. 6.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a communication system comprising: a first virtual physical (vPhy) circuit couplable to a host through a first vPhy interface; a second vPhy circuit couplable to a device through a second vPhy interface; and a vPhy-to-vPhy interface to couple to the first vPhy circuit to the second vPhy circuit, the vPhy-to-vPhy interface comprising a first data toggle signal line to transmit a first data toggle signal directed from the first vPhy circuit to the second vPhy circuit, and a second data toggle signal line to transmit a second data toggle signal directed from the second vPhy circuit to the first vPhy circuit; wherein the first vPhy circuit is to generate the first data toggle signal based on a first signal received from the host for transmission to the device, and the second vPhy circuit is to generate the second data toggle signal based on a second signal received from the device for transmission to the host.

Example 2 includes the subject matter of Example 1, wherein the first signal received from the host and the second signal received from the device are non-return-to-zero inverted (NRZI) signals.

Example 3 includes the subject matter of Examples 1 or 2, wherein the first vPhy circuit is to generate an NRZI input signal to be provided as an input to the host through the first vPhy interface based on the second data toggle signal.

Example 4 includes the subject matter of any of Examples 1-3, wherein the second vPhy circuit is to generate an NRZI input signal to be provided as an input to the device through the second vPhy interface based on the first data toggle signal.

Example 5 includes the subject matter of any of Examples 1-4, wherein the first vPhy circuit comprises: a latch to store a previously received data bit associated with the second signal received from the second vPhy circuit; a first Exclusive Or (XOR) gate to perform a logical XOR operation on a new transmit data bit associated with the first signal received from the host and the previously received data bit stored in the latch; an AND gate to perform a logical AND operation on the output of the first XOR gate and a data enable signal received from the host, the logical AND operation to generate the first data toggle signal; an OR gate to perform a logical OR operation on the first data toggle signal and the second data toggle signal; and a second XOR gate to perform a logical XOR operation on the output of the OR gate and the previously received data bit stored in the latch to generate a new received data bit as an output of the virtual physical circuit to be provided as an input to the host through the first vPhy interface.

Example 6 includes the subject matter of any of Examples 1-5, wherein the first vPhy circuit comprises a clock doubling circuit to: accept an input clock signal received from the host, the input clock signal at a first clock rate; generate an output clock signal at a second clock rate that is double the first clock rate; and provide the output clock signal to the latch to clock the new received data bit into the latch.

Example 7 includes the subject matter of any of Examples 1-4, wherein the second vPhy circuit comprises: a latch to store a previously received data bit associated with the first signal received from the first vPhy circuit; a first Exclusive Or (XOR) gate to perform a logical XOR operation on a new transmit data bit associated with the second signal received from the device and the previously received data bit stored in the latch; an AND gate to perform a logical AND operation on the output of the first XOR gate and a data enable signal received from the device, the logical AND operation to generate the second data toggle signal; an OR gate to perform a logical OR operation on the first data toggle signal and the second data toggle signal; and a second XOR gate to perform a logical XOR operation on the output of the OR gate and the previously received data bit stored in the latch to generate a new received data bit as an output of the virtual physical circuit to be provided as an input to the device through the second vPhy interface.

Example 8 includes the subject matter of any of Examples 1-7, wherein the second vPhy circuit comprises a clock doubling circuit to: accept an input clock signal received from the host, the input clock signal at a first clock rate; generate an output clock signal at a second clock rate that is double the first clock rate; and provide the output clock signal to the latch to clock the new received data bit into the latch.

Example 9 includes the subject matter of any of Examples 1-8, wherein the host and the first vPhy circuit are implemented in a first system-on-a-Chip (SoC), and the device and the second vPhy circuit are implemented in a second SoC.

Example 10 includes the subject matter of any of Examples 1-9, wherein the first SoC and the second SoC are disposed on the same integrated circuit.

Example 11 is a system-on-chip including the subject matter of any of Examples 1-8.

Example 12 is an integrated circuit including the subject matter of any of Examples 1-8.

Example 13 is a virtual physical (vPhy) circuit comprising: a latch to store a previously transmitted data bit; a first logic gate to perform a first logical operation on a new transmit data bit and the previously transmitted data bit stored in the latch; a second logic gate to perform a second logical operation on the output of the first logic gate and a data enable signal, the second logical operation to generate a data toggle output signal; a third logic gate to perform a third logical operation on the data toggle output signal and a received data toggle input signal; and a fourth logic gate to perform a fourth logical operation on the output of the third logic gate and the previously transmitted data bit stored in the latch to generate a received data bit as an output of the vPhy circuit.

Example 14 includes the subject matter of Example 13, wherein the first logic gate is an Exclusive Or (XOR) gate, the first logical operation is a logical XOR operation, the second logic gate is an AND gate, the second logical operation is a logical AND operation, the third logic gate is an OR gate, the third logical operation is a logical OR operation, the fourth logic gate is an XOR gate, and the fourth logical operation is a logical XOR operation.

Example 15 includes the subject matter of Examples 13 or 14, wherein the new transmit data bit is provided to the vPhy circuit from a SoundWire host as a non-return-to-zero inverted (NRZI) signal.

Example 16 includes the subject matter of any of Examples 13-15, wherein the received data bit output of the vPhy circuit is provided to a SoundWire host as a non-return-to-zero inverted (NRZI) signal.

Example 17 includes the subject matter of any of Examples 13-16, wherein vPhy circuit is a first vPhy circuit and the data toggle output signal is provided to a second vPhy circuit as a data toggle input signal to the second vPhy circuit.

Example 18 includes the subject matter of any of Examples 13-17, wherein vPhy circuit is a first vPhy circuit and the data toggle input signal is received from a second vPhy circuit as a data toggle output signal of the second vPhy circuit.

Example 19 includes the subject matter of any of Examples 13-18, further comprising a clock doubling circuit to: accept an input clock signal received from a SoundWire host, the input clock signal at a first clock rate; generate an output clock signal at a second clock rate that is double the first clock rate; and provide the output clock signal to the latch to clock the received data bit into the latch.

Example 20 is a method for on-chip communication, the method comprising: communicating between a SoundWire host and a first virtual physical (vPhy) circuit through a first vPhy interface; communicating between a SoundWire device and a second vPhy circuit through a second vPhy interface; and communicating between the first vPhy circuit and the second vPhy circuit through a first data toggle signal line to transmit a first data toggle signal directed from the first vPhy circuit to the second vPhy circuit, and a second data toggle signal line to transmit a second data toggle signal directed from the second vPhy circuit to the first vPhy circuit, wherein the first vPhy circuit generates the first data toggle signal based on a first signal received from the SoundWire host for transmission to the SoundWire device, and the second vPhy circuit is to generate the second data toggle signal based on a second signal received from the SoundWire device for transmission to the SoundWire host.

Example 21 includes the subject matter of Example 20, wherein the first signal received from the SoundWire host and the second signal received from the SoundWire device are non-return-to-zero inverted (NRZI) signals.

Example 22 includes the subject matter of Examples 20 or 21, further comprising generating, by the first vPhy circuit, an NRZI input signal to be provided as an input to the SoundWire host through the first vPhy interface based on the second data toggle signal.

Example 23 includes the subject matter of any of Examples 20-22, further comprising generating, by the second vPhy circuit, an NRZI input signal to be provided as an input to the SoundWire device through the second vPhy interface based on the first data toggle signal.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A communication system comprising:
a first virtual physical (vPhy) circuit couplable to a host through a first vPhy interface;
a second vPhy circuit couplable to a device through a second vPhy interface; and
a vPhy-to-vPhy interface to couple to the first vPhy circuit and to the second vPhy circuit, the vPhy-to-vPhy interface including a first data toggle signal line to transmit a first data toggle signal directed from the first vPhy circuit to the second vPhy circuit, and a second data toggle signal line to transmit a second data toggle signal directed from the second vPhy circuit to the first vPhy circuit,
wherein the first vPhy circuit is to generate the first data toggle signal based on a first signal received from the host for transmission to the device, and the second vPhy circuit is to generate the second data toggle signal based on a second signal received from the device for transmission to the host, wherein the first vPhy circuit is to generate a non-return-to-zero inverted (NRZI) input signal to be provided as an input to the host through the first vPhy interface based on the second data toggle signal.

2. The system of claim 1, wherein the first signal received from the host and the second signal received from the device are non-return-to-zero inverted (NRZI) signals.

3. The system of claim 1, wherein the second vPhy circuit is to generate an NRZI input signal to be provided as an input to the device through the second vPhy interface based on the first data toggle signal.

4. The system of claim 1, wherein the first vPhy circuit includes:
a latch to store a previously received data bit associated with the second signal received from the second vPhy circuit;
a first Exclusive Or (XOR) gate to perform a logical XOR operation on a new transmit data bit associated with the first signal received from the host and the previously received data bit stored in the latch;
an AND gate to perform a logical AND operation on an output of the first XOR gate and a data enable signal received from the host, the logical AND operation to generate the first data toggle signal;
an OR gate to perform a logical OR operation on the first data toggle signal and the second data toggle signal; and
a second XOR gate to perform a logical XOR operation on an output of the OR gate and the previously received data bit stored in the latch to generate a new received data bit as an output of the first vPhy circuit to be provided as an input to the host through the first vPhy interface.

5. The system of claim 4, wherein the first vPhy circuit includes a clock doubling circuit to:
accept an input clock signal received from the host, the input clock signal at a first clock rate;
generate an output clock signal at a second clock rate that is double the first clock rate; and
provide the output clock signal to the latch to clock the new received data bit into the latch.

6. The system of claim 1, wherein the second vPhy circuit includes:
a latch to store a previously received data bit associated with the first signal received from the first vPhy circuit;
a first Exclusive Or (XOR) gate to perform a logical XOR operation on a new transmit data bit associated with the second signal received from the device and the previously received data bit stored in the latch;
an AND gate to perform a logical AND operation on an output of the first XOR gate and a data enable signal received from the device, the logical AND operation to generate the second data toggle signal;
an OR gate to perform a logical OR operation on the first data toggle signal and the second data toggle signal; and
a second XOR gate to perform a logical XOR operation on an output of the OR gate and the previously received data bit stored in the latch to generate a new received data bit as an output of the second vPhy circuit to be provided as an input to the device through the second vPhy interface.

7. The system of claim 6, wherein the second vPhy circuit includes a clock doubling circuit to:
accept an input clock signal received from the host, the input clock signal at a first clock rate;
generate an output clock signal at a second clock rate that Is double the first clock rate; and
provide the output clock signal to the latch to clock the new received data bit into the latch.

8. The system of claim 1, wherein the host and the first vPhy circuit are implemented in a first system-on-a-Chip (SoC), and the device and the second vPhy circuit are implemented in a second SoC.

9. The system of claim 8, wherein the first SoC and the second SoC are disposed on a same integrated circuit.

10. An integrated circuit including the system of claim 1.

11. A first virtual physical (vPhy) circuit comprising:
a latch to store a previously transmitted data bit;
a first logic gate to perform a first logical operation on a new transmit data bit and the previously transmitted data bit stored in the latch;
a second logic gate to perform a second logical operation on an output of the first logic gate and a data enable signal, the second logical operation to generate a data toggle output signal;
a third logic gate to perform a third logical operation on the data toggle output signal and a received data toggle input signal, wherein the data toggle input signal is received from a second vPhy circuit as a data toggle output signal of the second vPhy circuit; and
a fourth logic gate to perform a fourth logical operation on an output of the third logic gate and the previously transmitted data bit stored in the latch to generate a received data bit as an output of the vPhy circuit.

12. The first vPhy circuit of claim 11, wherein the first logic gate is an Exclusive Or (XOR) gate, the first logical operation is a logical XOR operation, the second logic gate is an AND gate, the second logic operation is a logical AND operation, the third logic gate is an OR gate, the third logical operation is a logical OR operation, the fourth logic gate is an XOR gate, and the fourth logical operation is a logical XOR operation.

13. The first vPhy circuit of claim 11, wherein the new transmit data bit is provided to the first vPhy circuit from a SoundWire host as a non-return-to-zero inverted (NRZI) signal.

14. The first vPhy circuit of claim 11, wherein the received data bit output of the first vPhy circuit is provided to a SoundWire host as a non-return-to-zero inverted (NRZI) signal.

15. The first vPhy circuit of claim 11, wherein the data toggle output signal is provided to the second vPhy circuit as a data toggle input signal to the second vPhy circuit.

16. The first vPhy circuit of claim 11, further including a clock doubling circuit to:
  accept an input clock signal received from a SoundWire host, the input clock signal at a first clock rate;
  generate an output clock signal at a second clock rate that is double the first clock rate; and
  provide the output clock signal to the latch to clock the received data bit into the latch.

17. A method for on-chip communication, the method comprising:
  communicating between a SoundWire host and a first virtual physical (vPhy) circuit through a first vPhy interface;
  communicating between a SoundWire device and a second vPhy circuit through a second vPhy interface;
  communicating between the first vPhy circuit and the second vPhy circuit through a first data toggle signal line to transmit a first data toggle signal directed from the first vPhy circuit to the second vPhy circuit, and a second data toggle signal line to transmit a second data toggle signal directed from the second vPhy circuit to the first vPhy circuit,
  wherein the first vPhy circuit generates the first data toggle signal based on a first signal received from the SoundWire host for transmission to the SoundWire device, and the second vPhy circuit is to generate the second data toggle signal based on a second signal received from the SoundWire device for transmission to the SoundWire host;
  generating, by the first vPhy circuit, a first non-return-to-zero inverted (NRZI) input signal to be provided as an input to the SoundWire host through the first vPhy interface based on the second data toggle signal; and
  generating, by the second vPhy circuit, a second NRZI input signal to be provided as an input to the SoundWire device through the second vPhy interface based on the first data toggle signal.

18. The method of claim 17, wherein the first signal received from the SoundWire host and the second signal received from the SoundWire device are NRZI signals.

* * * * *